No. 749,403. PATENTED JAN. 12, 1904.
L. ROUSSEAU.
MOVABLE SWINGING BODY FURNACE FOR MELTING STEEL, &c.
APPLICATION FILED OCT. 4, 1900.
NO MODEL. 3 SHEETS—SHEET 1.
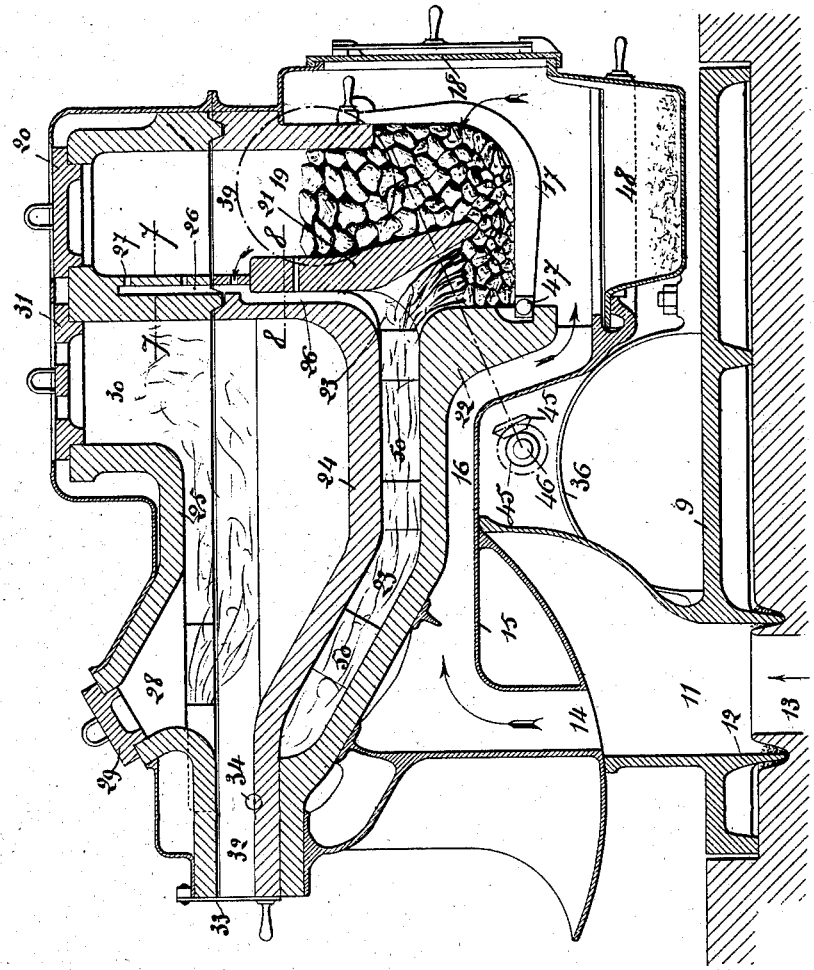
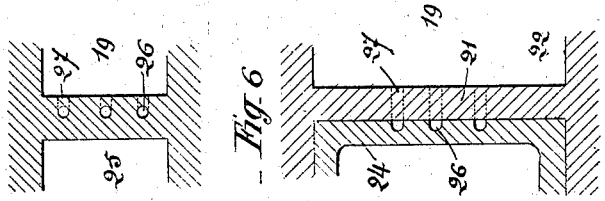

No. 749,403. PATENTED JAN. 12, 1904.
L. ROUSSEAU.
MOVABLE SWINGING BODY FURNACE FOR MELTING STEEL, &c.
APPLICATION FILED OCT. 4, 1900.
NO MODEL. 3 SHEETS—SHEET 2.

No. 749,403. PATENTED JAN. 12, 1904.
L. ROUSSEAU.
MOVABLE SWINGING BODY FURNACE FOR MELTING STEEL, &c.
APPLICATION FILED OCT. 4, 1900.
NO MODEL. 3 SHEETS—SHEET 3.

Witnesses:
C. Holloway
W. C. Pinckney

Inventor:
Louis Rousseau
By Edmond Congar Brown
Attorney

No. 749,403. Patented January 12, 1904.

UNITED STATES PATENT OFFICE.

LOUIS ROUSSEAU, OF PARIS, FRANCE.

MOVABLE SWINGING-BODY FURNACE FOR MELTING STEEL, &c.

SPECIFICATION forming part of Letters Patent No. 749,403, dated January 12, 1904.

Application filed October 4, 1900. Serial No. 31,954. (No model.)

*To all whom it may concern:*

Be it known that I, LOUIS ROUSSEAU, a citizen of the French Republic, residing in the city of Paris, France, have invented certain new and useful Improvements in Moving Furnaces with Swinging Bodies for Melting Steel and other Metals, of which the following is a specification.

My invention relates to improvements in portable furnaces with swinging bodies for melting steel and other metals; and its objects are to provide a furnace which first affords facilities for casting the metal; second, insures a complete use of the gases of combustion collecting in the fireplace above the combustible for increasing the calorific power of the furnace, and, third, accelerates the melting of the metal by an appropriate circulation of the total heat produced. I attain these objects by the device illustrated in the accompanying drawings, in which—

Figure 2:
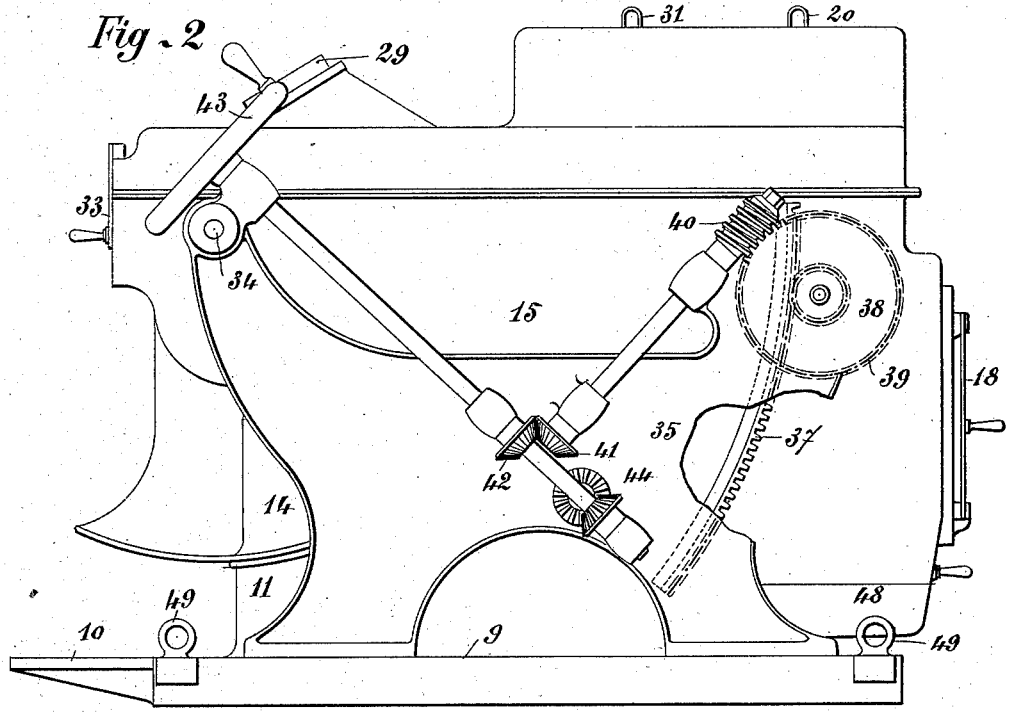
Figure 4:
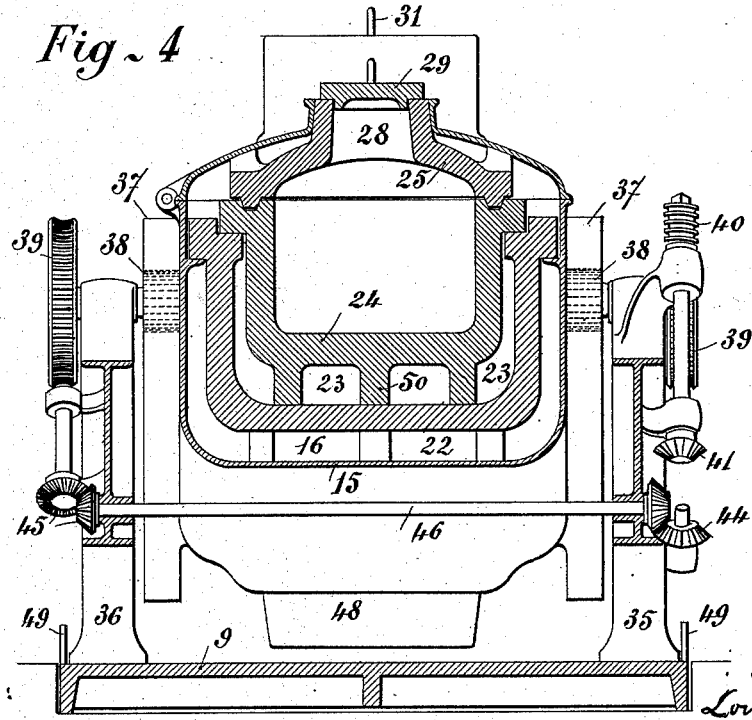
Figure 3:
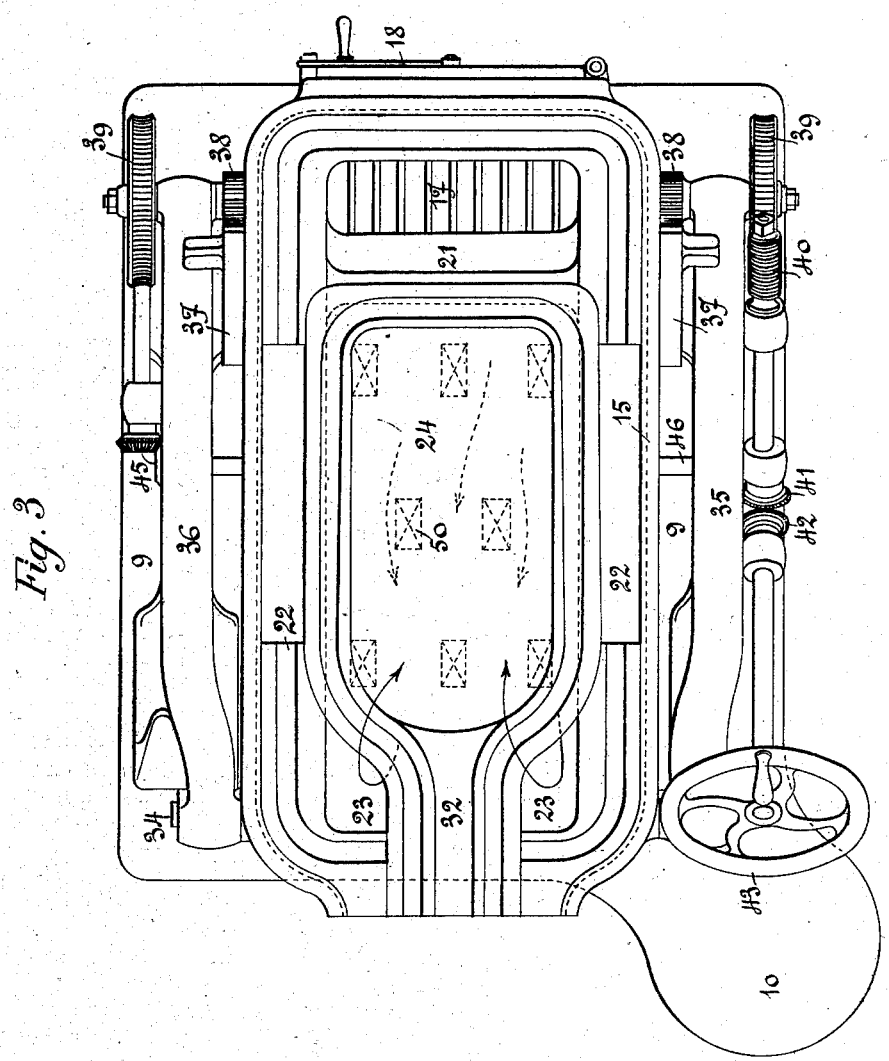

Figure 1 is a longitudinal section of the furnace without its cover; Fig. 2, a side elevation of the same without its cover. Fig. 3 is a top view of the furnace. Fig. 4 is a cross-section of the same on line $x\,x$ of Fig. 1. Fig. 5 is a horizontal section through the line 7 7 of Fig. 1, and Fig. 6 is a horizontal section through the line 8 8 of Fig. 1.

Similar numerals refer to similar parts throughout the several views.

The furnace rests on a bed-piece or bed-plate 9, which serves at the same time as a platform for the operator whose place is on the part 10 of the same. The said bed-plate is provided with a pipe-like piece 11, the lower part of which rests in an annular cavity 12, where the joint is made tight with sand or any other suitable material. The pipe or tube 11 communicates, on one hand, with the blast-pipe 13, through which the air comes in under pressure, and, on the other hand, with a conduit 14, leading with its upper part into the envelop 15, which surrounds the furnace. The conduit 14 communicates with a flue 16, by which the air is conducted under the grate 17 of the fireplace. A door 18, provided in the envelop 15, gives access to the cavity 19, forming the fireplace, in order to clean the grate or attend to the fire when necessary. The fire is fed from the top through the opening closed by the trap-door or cover 20. A division-plate 21, resting against a piece 22, made of refractory material, regulates the descent of the coke or coal and forms on the other side a flue 23, comprised for its greater part between the piece 22 and the crucible 24. This crucible, made of one or more pieces, is covered by a perforated cover 25, allowing the flue 23 to communicate with the inner cavity of the furnace. The crucible as well as its cover are provided in their rear parts with vertical conduits 26, leading by their lower part into the flue 23 and communicating in their upper part through little holes 27, the section of which is smaller than that of the conduits, with the cavity 19, Figs. 1, 5, and 6. The cover 25 is provided with an opening 28, closed by a cover 29, permitting inspection of the metal and verification of its state of fusion. The cover has, furthermore, a chimney 30, covered by a cover 31, which is perforated with holes of suitable section for the escaping of the gases and arranged in a manner that it can be easily removed for the charging of the furnace with the metal to be treated. The crucible 24 ends in its fore part in a neck or canal 32, which can be closed by an obturating-plate 33. This part of the furnace is mounted on a shaft 34, the ends of which rest on the side beams 35 and 36, which are fastened on the bed-plate 9.

On each of the two sides of the furnace is fastened a toothed segment 37, gearing with a pinion 38, on the shaft of which is mounted a larger wheel 39, gearing with an endless screw 40. The shaft of one of those two screws has at its other end a bevel-gear 41, gearing with the bevel-gear 42, the shaft of which has at its other end a wheel with a handle 43 and on the extension of the shaft another bevel-gear 44, gearing with a bevel-gear 45, mounted on the shaft 46, which latter communicates the rotary movement to the endless screw on the other side of the furnace. These different organs and the transmission of the movement are illustrated in Figs. 2, 3, and 4.

In order to permit of an easy cleaning of the grate 17, the latter is articulated on the shaft 47, round which it can turn when the door 18 is opened and the ash-box 48 removed. The ash-box moves like a drawer.

Having thus fully described the furnace forming the object of my invention, I shall now proceed to show its working.

The blasting-air being provided by any suitable blasting device passes through the conduits 13 and 14 and the flue 15 under the grate 17, which it traverses, as well as the fuel, kindling the fire thereby. The flames and the gases of combustion follow the flues 23, surrounding the crucible 24 on all sides, thereby heating the latter thoroughly. Thereafter they pass through the holes of the cover into that part of the furnace which is comprised between the crucible 24 and its cover 25, where they yield their heat directly to the metal of which they sweep the surface, and at last they escape through the chimney 30. It will be noticed that the gases of combustion have to run a long way before they are allowed to leave the furnace, so that they are compelled to yield the maximum of heat to the furnace. Another result of this system of circulation of the gases is that the metal receives the heat from all sides at a nearly uniform degree. It is true that the heat decreases on its way from the fireplace to the flues of the cover; but the return of the flames being stronger at this place than near the chimney the sum of heat yielded to the metal from below and above is almost constant. Not all the gases of combustion, however, escape through the flue 23. A certain part of the same through the smaller one collects in the space of the cavity 19 above the burning combustible, and as there is at this place no calorific element powerful enough to burn them, because the upper layers of the fuel not being in direct contact with the air burn only slowly, the said gases are bound to escape through the holes 27 into the conduit 26 and the flue 23, where they are attracted by the draft produced in the latter by the train of flames, air, and gas, and here they are ignited by the high temperature surrounding them, so that they burn and produce by their combustion a surplus of heat, so all the gases produced by the combustion of the fuel are completely used for increasing the calorific power of the furnace; but the construction of the furnace and its working, as heretofore described, has still another advantage. By passing into the flue 23 the burning gases of combustion also yield part of their heat to the piece 22 and through the same to the blast-air, which therefore arrives below this piece through the flue or conduit 16 into the fireplace at a temperature high enough to result in a notable saving of fuel.

In order to take the furnace to the place where the metal in fusion is to be cast, the bed-plate 9 of the furnace is provided with loops 49, where a chain or cable or a bar may be introduced for lifting it on a moving platform or any other means of transportation.

When the furnace has been taken to the place where the casting is to be done, it is necessary to connect first the two conduits 11 and 12 (the connection of which is now broken) through an elastic conduit, so as to insure the arrival of the blast-air to the fireplace. Then the operator on the platform 10 turns the wheel 43 in the proper direction whereby the whole train of gearing heretofore described is put into movement and the moving part of the furnace lifted until its inclination is sufficient to make the metal flow through the neck 32 for being cast or collected in whatever manner it may be. When the crucible is empty, the furnace is taken back to its proper place for a new operation. As by the swinging of the furnace round the shaft 34 the joint between the conduit 14 and the tube 11 has been broken, it is of course necessary to make the joint tight anew when all the organs have settled in their normal position.

It will be noticed that the whole upper part of the furnace and its envelop can be easily removed for repairing the furnace, if necessary, or for any other reason.

The upper part of the furnace may be made movable on its lower part if this should be found desirable. Moreover, the iron envelop 15, the refractory piece 22, and the crucible or melting-basin 24 being placed in stories one above the other, so that they can be removed successively, all the organs of the furnace can be easily cleaned.

It may happen that the casting of the metal is to be done at the very place where the furnace stands. For this reason the upper edge of the tube 11 is formed in a curve the center of which is identical with the center of the shaft 34. The conduit 14 has side pieces or wings at its lower end, which are also curved in a way that the center of the curve is identical with the center of the shaft 34, so that when the furnace swings round the said shaft to give it the desired inclination the conduit 14 by means of its wings remains in contact with the upper edge of the tube 11 and the air continues to arrive into the fireplace during the casting operation. This disposition of the furnace is of great value in the case where it is necessary or desirable to introduce into the furnace an additional charge of metal while the casting is going on, this additional charge of metal to be cast with the metal already molten. This is possible with the furnace when the operation is well conducted. The advantage of this arrangement lies in the possibility that with a furnace built for a charge of, for instance, one thousand kilograms one can melt twelve hundred or thirteen hundred kilograms and even more.

It will be noticed that the crucible or basin 24 rests on the piece 22 by means of legs 50, which are solid either with the crucible 24 or with the piece 22, as the case may be. These legs must be given as small a section as possible, so that they do not interfere with the circulation of the gases.

What I claim as my invention, and desire to secure by Letters Patent, is—

1. A furnace for melting metals comprising a fire-chamber 19 provided below with a bent grate 17 mounted upon an axis 47 carried by the lower part of the refractory furnace-lining 22, a partition 21 in the fire-chamber supported upon the refractory lining 22 and provided with an opening, a plumbago crucible 24 provided with a neck 32 and supplied beneath with legs 50 supported upon the lower wall of the refractory lining 22, a flue 23 traversed by the legs 50 and arranged between the crucible 24 and the lower and side refractory lining 22 and in communication, through the opening pierced in the partition 21, with the interior of the fire-chamber, a plumbago cover 25 placed upon the crucible 24 and surmounted by a chimney 30 partially closed by a plug 31, the interior of said cover being in communication with the flue 23 comprised between the crucible and the refractory lining 22 by means of openings pierced in said cover on each side of the neck 32 of the crucible 24, substantially as described.

2. A furnace for melting metals comprising a fire-chamber 19 furnished in the lower part with a bent grate 17 mounted upon an axis 47 supported by the lower part of the refractory furnace-lining 22, a partition 21 in the fire-chamber supported upon the refractory furnace-lining 22 and pierced by an opening, a plumbago crucible 24 furnished with a neck 32 and supplied beneath with legs 50 supported upon the lower wall of the refractory furnace-lining 22, a flue 23 traversed below by the legs 50 and arranged between the crucible 24 and the lower and side refractory furnace-lining 22 and in communication, through the opening pierced in the partition 21, with the interior of the fire-chamber, a conduit 26 pierced in the wall common to the fire-chamber and the chimney 30 of the cover 25 and also in the crucible 24, the said conduit 26 discharging below in the conduit 23 and being in communication at its upper part with the chamber 19 of the furnace through openings 27 pierced in the partition of this chamber.

3. A furnace for melting metals comprising a fire-chamber 19 provided with a bent grate 17 mounted upon an axis 47 carried by the lower part of the refractory furnace-lining 22, a partition 21 in the fire-chamber supported upon the refractory lining 22 and pierced by an opening, a plumbago crucible 24 supplied with a neck 32 and provided at the lower part with legs 50 supported upon the lower wall of the refractory furnace-lining 22, a flue 23 traversed by the legs 50 and comprised between the crucible 24 and the lower and side refractory lining 22 and in communication, through the opening pierced in the partition 21, with the interior of the fire-chamber, a metallic jacket 15 in which are located the lower part of the fire-chamber 19, the grate 17, the refractory lining 22 of the furnace and the plumbago crucible 24, a curved conduit 14, 16, comprised between the metallic jacket 15 and the refractory furnace-lining 22 in communication, through the partition with the under side of the grate 17 of the fire-chamber 19, two fixed trunnions 34 having the same axes upon the metallic jacket 15 on each side of the neck 32 of the plumbago crucible 24, a metallic wall carried by the metallic jacket 15 and disposed concentrically with the trunnions 34 at the lower extremity of the part 14 of the conduit 14, 16, arranged between the metallic envelop 15 and the refractory furnace-lining 22, substantially as described.

4. A furnace for melting metals comprising a metallic jacket 15 in which are located the lower parts of the fire-chamber 19, the grate 17, the refractory furnace-lining 22, and the plumbago crucible 24, a curved conduit 14, 16, located between the metallic jacket 15 and the refractory furnace-lining 22, in communication, through the partition, with the under side of the grate 17 of the fire-chamber 19, two fixed trunnions 34 having the same axis upon the metallic jacket 15, on each side of the neck 32 of the plumbago crucible 24, a metallic wall carried by the jacket 15, and arranged concentrically with the trunnions 34 at the lower extremity of the part 14 of the conduit 14, 16, comprised between the metallic jacket 15 and the refractory furnace-lining 22, a toothed segment 37 fixed on each side of the metallic jacket 15 and concentric with the trunnions 34, two side beams 35 and 36 by which the trunnions 34 of the metallic jacket 15 are carried and which are fixed upon the base 9, two pinions 38 keyed each upon an axis carried by one of the side beams 35 and 36 and engaging each with one of the toothed segments 37, a wheel 39 mounted upon each of the axes of the pinions 38 and gearing with an endless screw 40 of which the axis is carried by the beam situated on the same side of the furnace, a bevel-gear 41 keyed upon the shaft of the screw 40 carried by the beam 35, gearing with a similar pinion 42, a shaft of the pinion 42 carried by the beam 35 and upon which are keyed a wheel 43 and a bevel-gear 44, a shaft 46 carried by the two side beams 35 and 36 and upon which are keyed two bevel-gears of which one is in gear with the pinion 44, keyed upon the shaft of the operating-wheel 43, and of which the other is geared with a similar pinion keyed upon the shaft of the endless screw 40, carried by the side beam 36, substantially as described.

5. A furnace for melting metals comprising a metallic jacket 15 in which are located the lower part of the fire-chamber 19, the grate 17, the refractory furnace-lining 22 and the plumbago crucible 24, a curved conduit 14, 16, located between the metallic jacket 15 and the refractory furnace-lining 22, in communication, through the partition, with the under side of the grate 17 of the fire-chamber 19, two fixed trunnions 34, having the same axis, upon the metallic jacket 15, on each side of the neck 32 of the plumbago crucible 24, a metallic wall carried by the metallic jacket 15 and arranged concentrically with the trunnions 34, at the lower extremity of the part 14 of the conduit 14, 16, comprised between the metallic jacket 15 and the refractory furnace-lining 22, two side beams 35 and 36 by which the trunnions 34 of the metallic jacket 15 are carried and which are fixed upon the base 9, a flue 11 formed with the base 9 and of which the lower extremity 12 is located in an annular cavity lined with sand and hollowed out at the upper extremity of the conduit 13 for conducting air, the upper extremity of the said flue 11 being enlarged, cut out concentrically with the trunnions 34 and adjusted to move easily against the metallic wall carried by the metallic jacket 15 at the lower extremity of the part 14 of the conduit 14, 16, with which it is in communication, substantially as described.

Signed at Paris, France, this 15th day of September, 1900.

LOUIS ROUSSEAU.

Witnesses:
PAUL BACAU,
CHARLES MENGELLE.